Figure 1:
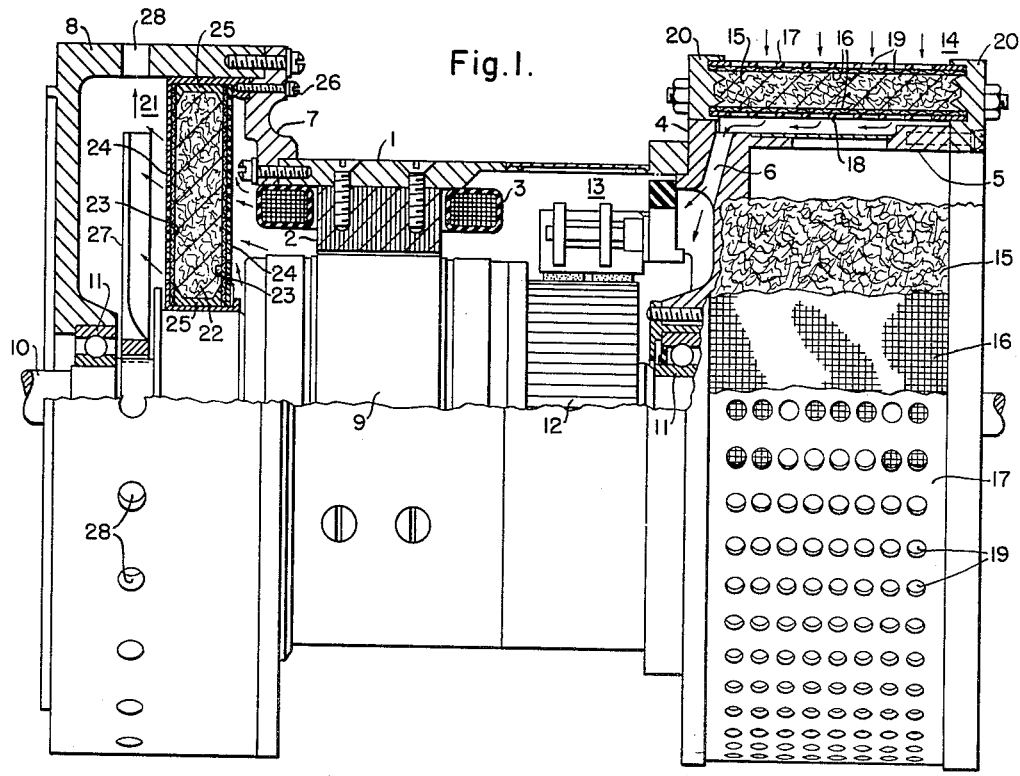

April 22, 1952   H. D. ELSE ET AL   2,594,003
EXPLOSION-PROOF DYNAMOELECTRIC MACHINE
Filed Nov. 4, 1949

WITNESSES:
Robert A. Baird
W. L. Groome

INVENTORS
Harry D. Else &
Paul J. Weber.
BY
ATTORNEY

Patented Apr. 22, 1952

2,594,003

UNITED STATES PATENT OFFICE 2,594,003

EXPLOSION-PROOF DYNAMOELECTRIC MACHINE

Harry D. Else and Paul J. Weber, Lima, Ohio, assignors to Westinghouse Electric Corporation, East Pittsburgh, Pa., a corporation of Pennsylvania Application November 4, 1949, Serial No. 125,557

9 Claims. (Cl. 171—252)

The present invention relates to explosion-proof dynamo-electric machines, and, more particularly, to explosion-proof machines of light weight and small size having improved flame-suppressing means.

Dynamo-electric machines which are intended for use in hazardous atmospheres, or in locations where inflammable or explosive gas or vapor may get into the interior of the machine and be ignited, are required to be of explosion-proof construction. Such machines must be built so that they are capable of withstanding the pressures developed by an explosion within the machine, and so that no flame or hot gas resulting from the explosion is emmitted from the machine at a high enough temperature to ignite combustible gas or vapor in the air outside the machine.

In the conventional construction of explosion-proof dynamo-electric machines, the machine is totally enclosed in a frame structure or housing which is of sufficiently heavy construction to withstand internal explosion pressures, and which has long, close fits between adjoining parts, so that any gas which may escape through such joints will be cooled to a safe temperature before it reaches the outside. Since such a machine is completely enclosed and, in effect, sealed, it cannot be ventilated by circulation of outside air through the machine, and the heat generated in it can be removed only by circulation of the internal air within the housing, which carries the heat to the housing surfaces, from which it is radiated, or otherwise dissipated. This inadequate ventilation requires a machine of given rating to be considerably larger in physical size than a machine of the usual open construction, in order to prevent overheating. Explosion-proof dynamo-electric machines of conventional design, therefore, are of heavy, massive construction to withstand internal explosion pressures, and of large physical size to prevent overheating. In many applications of such machines, these features are not particularly objectionable, but, in such applications as electric motors and generators for use on aircraft, the large size and great weight of conventional explosion-proof machines cannot be tolerated, and explosion-proof motors or generators of conventional construction cannot be used on aircraft, or in other applications where the weight and size must be kept to a minimum.

A light-weight explosion-proof dynamo-electric machine which is suitable for aircraft use, and similar applications, is disclosed in a copending application of H. D. Else et al., Serial No. 85,854, filed April 6, 1949, now abandoned, and assigned to Westinghouse Electric Corporation. The machine shown in that application is ventilated by continuous flow of outside air through the machine, and is made explosion-proof by means of flame suppressors which are interposed in the path of the air, so that air or hot gases entering or leaving the machine must pass through the flame suppressors, which force the air to flow in a long, circuitous path over a series of baffles so that hot gas escaping from the machine is cooled, and any flame is quenched, before reaching the outside of the machine. This type of machine has satisfactory explosion-proof characteristics, and its weight and size can be kept small, but it has been found that the baffles utilized in this machine materially restrict the free flow of ventilating air through the machine, so that adequate ventilation is interfered with, especially in low-speed machines. It has also been found that, in the event of an internal explosion or combustion in a machine of this type, there is a tendency to localized burning of the gases closely adjacent the inner surface of the flame suppressor, which results in overheating and burning of the baffles. Similar difficulties have also been encountered in other types of flame suppressors which have been proposed for use in making dynamo-electric machines explosion-proof.

The principal object of the present invention is to provide a light-weight explosion-proof dynamo-electric machine which is ventilated by continuous flow of outside air through the machine, and which is made explosion-proof by flame-suppressing means which are interposed in the path of the air but which offer minimum obstruction to the free flow of the air.

Another object of the invention is to provide a light-weight, explosion-proof dynamo-electric machine ventilated by continuous flow of outside air through the machine and provided with flame-suppressing means interposed in the path of the air which has a sufficiently large area, transverse to the direction of air flow, to permit substantially unrestricted flow of the air, and which has a large area of material of high thermal conductivity exposed to the interior of the machine, so that the heat resulting from any localized burning within the machine is conducted away and dissipated without local overheating of the flame-suppressing means.

A further object of the invention is to provide a flame-suppressing means for explosion-proof dynamo-electric machines which includes a porous metal mass or body having a multiplicity of small, more or less parallel, air paths therethrough, so that air flow through the flame suppressor is substantially unrestricted, but the air stream is broken up into many small streams, and the air or hot gas escaping from the machine is cooled to a safe temperature in passing through the flame suppressor.

Figure 2:
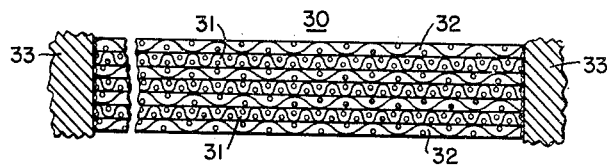

Other objects and advantages of the invention will be apparent from the following detailed description, taken in connection with the accompanying drawing, in which:

Figure 1 is a view, partly in elevation and partly in longitudinal section, of a dynamo-electric machine embodying the invention; and Fig. 2 is a fragmentary sectional view showing an alternative form of flame suppressor.

The invention is shown in the drawing embodied in an explosion-proof direct-current motor intended for use in aircraft, the particular motor shown being a cargo hoist motor. It will be apparent, however, that the invention is not limited to this particular type of machine but is generally applicable to dynamo-electric machines of any type where light weight and small size are important.

The motor shown in Fig. 1 has a frame member 1 on which are mounted pole pieces 2 carrying field windings 3. The frame 1 is closed at one end by an end bracket 4, which may be of any suitable construction. In the particular machine shown for the purpose of illustration, the end bracket 4 is designed with a large recess, indicated at 5, which is exterior to the machine itself, and which is intended to receive a brake or clutch mechanism which has not been illustrated since it is not a part of the present invention. The end bracket 4 is provided with a series of peripheral openings 6 through which ventilating air may flow into the machine. An annular mounting flange 7 is secured to the other end of the frame 1. An end bracket 8 is shown as being secured to the mounting flange 7, but it will be apparent that the flange 7 might be secured directly to a driven device, or to any other suitable support. The motor also has an armature member 9 of any suitable type mounted on a shaft 10 which is supported in anti-friction bearings 11 in the end brackets 4 and 8. A commutator 12 is mounted on the shaft 10 and suitable brush holders and brush rigging 13 are supported on the end bracket 4 to carry brushes engaging the commutator 12. It will be seen that the machine is substantially completely enclosed by the frame 1 and the end bracket 4, but that air can enter the machine through the openings 6 in the end bracket. At the other end of the machine the frame 1 is substantially open to permit escape of the ventilating air, but the machine is enclosed at that end by the end bracket 8, or by any other mounting or bearing-supporting means to which the flange 7 may be secured.

The motor is made explosion-proof by means of flame-suppressing means interposed in the path of air entering or leaving the machine. The flame-suppressing means 14 at the right-hand end of the machine is generally cylindrical in shape, and is mounted on the end bracket 4 to cover the openings 6, so that air or gas entering or leaving the machine through these openings must pass radially through the flame suppressor 14. In the preferred embodiment shown in Fig. 1, the flame suppressor consists of a mass or body 15 of metal wool, which may be made of strands or cuttings of a suitable metal of high thermal conductivity, preferably either copper or aluminum, matted together to form a mass of metal wool and shaped into a cylindrical body as indicated in the drawing. A layer of wire screen 16 is placed on each side of the metal wool 15, to retain the metal wool in place and to assist in breaking up the air stream. The wire screen 16 is preferably of relatively fine mesh, such as 30 meshes per inch, in order to effectively break up the air into a large number of small air streams. A perforated cylindrical metal plate 17 is placed on the outside of the wire screen 16, and a similar perforated plate 18 is disposed on the inside of the flame suppressor. Thus, the flame suppressor 14 consists of the metal wool 15, which forms a porous metal body having a multiplicity of more or less parallel small air passages extending through it, with a fine mesh wire screen and a perforated metal plate on each side of the metal wool. The metal plates 17 and 18 have relatively large perforations 19, which may be of the order of ¼ inch in diameter, and these plates provide mechanical support for the flame suppressor, as well as exposing a large area of material of good thermal conductivity to the interior of the machine. The flame suppressor 14 is supported between annular metal rings 20 on opposite sides, which are secured in any suitable manner to the end bracket 4.

The flame suppressor 21 at the left-hand end of the machine is generally similar to the flame suppressor 14, but because of the particular construction of the machine shown in the drawing, the flame suppressor 21 is of annular design to permit axial flow of air through it. The flame suppressor 21 consists of an annular mass or body of metal wool 22 with an annular layer of fine-mesh wire screen 23 on each side of it, and a perforated, annular, metal plate 24 on each side of the wire screen. The screens 23 and plates 24 are secured at their edges to cylindrical metal supporting members 25, and the flame suppressor is secured to the flange 7 in any suitable manner, as by screws 26. The inner supporting member 25 has a close running clearance with the shaft 10, and this clearance is sufficiently long axially to adequately cool any heated gas that may escape through this clearance. It will be seen, therefore, that the flame suppressor 21 closes the end of the frame 1 so that any air or gas entering or leaving the machine at this end must pass through the flame suppressor. The machine is ventilated, in normal operation, by air which enters at the right-hand end through the flame suppressor 14 and the openings 6, and escapes at the left-hand end through the flame suppressor 21, the path of the air being generally indicated by the arrows on the drawing. If desired, a fan 27 may be mounted on the shaft 10 to assist in drawing air through the machine to insure adequate ventilation, the air discharged by the fan escaping through openings 28 in the end bracket 8.

It will be apparent that any heated gas or flame escaping from the machine as a result of an internal explosion, or internal combustion, must pass through one or the other of the flame suppressors 14 and 21. In so passing the stream of hot gas is broken up into a large number of small streams flowing through the many small air passages in the metal wool, and because of the high thermal conductivity of the metal wool, the heat is conducted away and dissipated, and the gas is cooled to a safe temperature before it reaches the outside. Any flame propagating toward the outside from the interior of the machine is thus quenched in the flame suppressors. It will be noted that the flame suppressors present a relatively large area transversely to the direction of air flow, which is at least as large as the combined cross-sectional area of the air passages through the machine, so that air flows through the flame suppressors in a path which is not materially restricted, and the free flow of air is substantially unobstructed, since the stream of air is merely broken up into a large number of small parallel air streams by the flame suppressor, but is not forced into restricted or partially restricted paths. It will also be noted that the metal plates on the inner sides of the flame suppressors present large areas of material of high thermal conductivity on the inside of the machine. Thus, if any localized burning of gas occurs within the machine adjacent to the flame suppressors, the heat of such localized burning is rapidly conducted away and dissipated, so that no local overheating of the flame suppressor occurs.

The flame suppressor may be of any suitable construction which provides a porous metal body having a multiplicity of small air passages therethrough. In the preferred embodiment described above, a mass of metal wool is used for this purpose. An alternative construction is shown in Fig. 2, which is a fragmentary sectional view of a portion of a radial flame suppressor generally similar to the flame suppressor 14. The flame suppressor 30 of Fig. 2 consists of a plurality of layers of fine-mesh wire screen 31 alternating with layers of coarse-mesh wire screen 32. The coarse-mesh screen 32 may be of the type sometimes called "hardware cloth," having meshes $\frac{3}{16}$ to $\frac{3}{8}$ of an inch wide. The fine-mesh screen 31 preferably has from 20 to 40 meshes per inch to break the air up into many small air streams. The layers of wire screen 31 and 32 are supported between metal support members 33, corresponding to the rings 20 of Fig. 1, and the screens 31 and 32 are preferably soldered or brazed at their edges to the support members 33 so as to have a good thermal connection with adjacent metal masses of high thermal capacity to assist in rapidly dissipating heat.

It will be seen that this construction provides a porous metal body having a multiplicity of small air passages therethrough, and is thus equivalent to the mass of metal wool used in the flame suppressors 14 and 20 described above. The action of the flame suppressor 30 in breaking up the air stream and cooling hot gasses passing through it is therefore the same as that previously described. The number of layers of wire screen is determined primarily by the size of the motor and the rate of air flow. Perforated metal plates similar to the plates 17 and 18 may be provided, if desired, although these plates may not always be necessary with this type of flame suppressor since the wire screens themselves provide a large area of material of high thermal conductivity exposed to the inside of the motor, and the metal plates are not needed for mechanical support unless the flame suppressor is of relatively large size. It will be apparent that the alternate layers of coarse and fine-wire screen may also be arranged in an annular configuration similar to that of the flame suppressor 21.

It should now be apparent that an explosion-proof motor has been provided which can readily be made of light weight and small size, since it is effectively ventilated by continuous circulation of outside air, and internal explosion pressures are relieved by escape of the gases, so that the heavy, massive construction of conventional explosion-proof machines is not required. The flame suppressors effectively prevent the escape of flame or gas from the machine at a high enough temperature to ignite inflammable gas or vapor on the outside, but do not substantially restrict or obstruct the free flow of ventilating air. The particular construction of flame suppressor described has the further advantage of preventing local overheating or burning of the flame suppressor itself by localized burning of gas closely adjacent the flame suppressor. This construction is very effective in dissipating heat and quenching flame propagating from the interior of the motor toward the outside, and is capable of withstanding more or less continuous burning within the machine for a reasonable time. For example, if the motor is operating in a space containing inflammable vapor, such as gasoline vapor, which may sometimes occur in aircraft use, and if the incoming ventilating air is ignited within the motor, continuous burning may occur within the motor as inflammable vapor continues to enter, but the motor will continue to operate without permitting flame or hot gas to escape at a high enough temperature to ignite the vapor surrounding the motor. This characteristic obviously makes the motor very well suited for such hazardous applications as certain locations in airplanes where there is danger of the air being filled with gasoline vapor.

It may sometimes be desirable to provide an external indication that combustion is occurring in the motor, and this can readily be done by means of thermocouples responsive to the temperature within the motor, which can be connected to give a warning signal when the internal temperature rises high enough to indicate that combustion is occurring. Another means of providing such an external indication is to treat the flame suppressors with a material of a type which will color the gas discharged from the machine, such as certain salts which give off characteristic colored vapors when overheated. For example, sodium salts produce a yellow color, barium salts a green color, and strontium salts give off a purple vapor. By impregnating the metal wool of the flame suppressors with solutions of such salts as these, the air or gas discharged from the machine will be colored when internal burning is occurring, and a reliable indication is provided.

Certain preferred embodiments of the invention have been shown and described for the purpose of illustration, but it will be apparent that various other modifications and embodiments of the invention are possible, and it is to be understood, therefore, that the invention is not limited to the particular details of construction shown, but in its broadest aspects it includes all equivalent embodiments and modifications which come within the scope of the appended claims.

We claim as our invention:

1. In an explosion-proof dynamo-electric machine having a stator member and a rotor member, said stator member including a frame structure enclosing the machine and having openings for entrance and discharge of ventilating air, flame-suppressing means completely closing the paths of air or gases entering or leaving the machine, each of said flame-suppressing means comprising a mass of metal wool, a layer of wire screen on each side of the mass of metal wool, and a perforated metal plate on the outside of each layer of wire screen, the area of the flame-suppressing means being at least as large as the total area of the air paths it closes to permit substantially unrestricted flow of air therethrough, and the metal plate on the inner side of the flame-suppressing means extending over the entire area thereof which is exposed to the interior of the machine.

2. In an explosion-proof dynamo-electric machine having a stator member and a rotor member, said stator member including a frame structure enclosing the machine and having openings for entrance and discharge of ventilating air, flame-suppressing means completely closing the paths of air or gases entering or leaving the machine, each of said flame-suppressing means comprising a plurality of layers of wire screen, said layers of wire screen being alternately of fine and coarse mesh.

3. In an explosion-proof dynamo-electric machine having a stator member and a rotor member, said stator member including a frame structure enclosing the machine and having openings for entrance and discharge of ventilating air, flame-suppressing means completely closing the paths of air or gases entering or leaving the machine, each of said flame-suppressing means comprising a plurality of layers of wire screen, said layers of wire screen being alternately of fine and coarse mesh, and metal supporting members at the ends of the layers of screen and joined to the screen by connections of good thermal conductivity.

4. In an explosion-proof dynamo-electric machine having a stator member and a rotor member, said stator member including a frame structure enclosing the machine and having openings for entrance and discharge of ventilating air, flame-suppressing means completely closing the paths of air or gases entering or leaving the machine, each of said flame-suppressing means comprising a plurality of layers of wire screen, said layers of wire screen being alternately of fine and coarse mesh, and the area of the flame-suppressing means being at least as large as the total area of the air paths it closes to permit substantially unrestricted flow of air therethrough.

5. In an explosion-proof dynamo-electric machine having a stator member and a rotor member, said stator member including a frame structure enclosing the machine and having openings for entrance and discharge of ventilating air, flame-suppressing means disposed in the path of said air so that all air or gas entering or leaving the machine must pass through the flame-suppressing means, each of said flame-suppressing means comprising a porous metal body having a multiplicity of small air passages therethrough permitting substantially unobstructed flow of air through the flame-suppressing means over its entire area, and the flame-suppressing means also including a surface of thermally conductive material extending continuously over the entire area of the flame-suppressing means which is exposed to the interior of the machine.

6. In an explosion-proof dynamo-electric machine having a stator member and a rotor member, said stator member including a frame structure enclosing the machine and having openings for entrance and discharge of ventilating air, flame-suppressing means disposed in the path of said air so that all air or gas entering or leaving the machine must pass through the flame-suppressing means, each of said flame-suppressing means comprising a porous metal body having a multiplicity of small air passages therethrough permitting substantially unobstructed flow of air through the flame-suppressing means over its entire area, the area of each flame-suppressing means being at least as large as the total area of the air path in which it is placed, and the flame-suppressing means also including a surface of thermally conductive material extending continuously over the entire area of the flame-suppressing means which is exposed to the interior of the machine.

7. In an explosion-proof dynamo-electric machine having a stator member and a rotor member, said stator member including a frame structure enclosing the machine and having openings for entrance and discharge of ventilating air, flame-suppressing means disposed to close said openings so that air or gas entering or leaving the machine must pass through the flame-suppressing means, each of said flame-suppressing means comprising a porous metal body having a multiplicity of small air passages therethrough permitting substantially unobstructed flow of air through the flame-suppressing means over its entire area, the area of each flame-suppressing means being at least as large as the total area of the openings it closes, and the flame-suppressing means also including a metal surface extending continuously over the entire area of the flame-suppressing means which is exposed to the interior of the machine.

8. In an explosion-proof dynamo-electric machine having a stator member and a rotor member, said stator member including a frame structure enclosing the machine and having openings for entrance and discharge of ventilating air, flame-suppressing means disposed to close said openings so that air or gas entering or leaving the machine must pass through the flame-suppressing means, each of said flame-suppressing means comprising a mass of metal wool, and supporting means for retaining the metal wool in position, the area of each flame-suppressing means being at least as large as the total area of the openings it closes, and the supporting means providing a surface of thermally conductive material extending continuously over the entire area of the flame-suppressing means which is exposed to the interior of the machine.

9. In an explosion-proof dynamo-electric machine having a stator member and a rotor member, said stator member including a frame structure enclosing the machine and having openings for entrance and discharge of ventilating air, flame-suppressing means disposed to close said openings so that air or gas entering or leaving the machine must pass through the flame-suppressing means, each of said flame-suppressing means comprising a mass of metal wool, and a perforated metal plate on each side of said mass of metal wool to support it in position, the area of each flame-suppressing means being at least as large as the total area of the openings it closes, the metal plates being perforated throughout their entire area and at least the inner plate extending over the entire area of the flame-suppressing means which is exposed to the interior of the machine.

HARRY D. ELSE.
PAUL J. WEBER.

REFERENCES CITED

The following references are of record in the file of this patent:

UNITED STATES PATENTS

| Number | Name | Date |
|---|---|---|
| 722,567 | Crawford | Mar. 10, 1903 |
| 1,049,011 | Waxbom | Dec. 31, 1912 |
| 1,262,317 | Finney | Apr. 9, 1918 |
| 1,532,473 | Byrne | Apr. 7, 1925 |
| 1,720,364 | Holmes | July 9, 1929 |
| 1,898,126 | Hedglon | Feb. 21, 1933 |
| 1,972,315 | Ramey | Sept. 4, 1934 |
| 2,452,248 | Lee | Oct. 26, 1948 |
| 2,454,314 | Gent | Nov. 23, 1948 |

FOREIGN PATENTS

| Number | Country | Date |
|---|---|---|
| 12,053 | Great Britain | of 1907 |